(12) United States Patent
Handach (10) Patent No.: US 11,268,863 B2
(45) Date of Patent: Mar. 8, 2022

(54) GAUGE WITH A FLEXIBLE WINDOW COVER

(71) Applicant: WIKA Alexander Wiegand SE & Co. KG, Klingenberg (DE)

(72) Inventor: Sasha Handach, Lawrenceville, GA (US)

(73) Assignee: WIKA Alexander Wiegand SE & Co. KG, Klingenberg (DE)

( * ) Notice: Subject to any disclaimer, the term of this patent is extended or adjusted under 35 U.S.C. 154(b) by 384 days.

(21) Appl. No.: 16/459,534

(22) Filed: Jul. 1, 2019

(65) Prior Publication Data

US 2020/0011739 A1 Jan. 9, 2020

Related U.S. Application Data

(60) Provisional application No. 62/694,014, filed on Jul. 4, 2018.

(51) Int. Cl.
| | |
|---|---|
| G01K 9/00 | (2006.01) |
| G01K 1/08 | (2021.01) |
| G01K 1/26 | (2006.01) |
| G01L 19/10 | (2006.01) |
| G01K 5/62 | (2006.01) |
| G01L 19/16 | (2006.01) |
| G01K 1/06 | (2006.01) |

(52) U.S. Cl.
CPC ............. *G01K 1/08* (2013.01); *G01K 1/06* (2013.01); *G01K 1/26* (2013.01); *G01K 5/62* (2013.01); *G01L 19/10* (2013.01); *G01L 19/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,693,446 | A * | 9/1972 | MacNiel | G01C 13/008 73/300 |
| 4,016,760 | A * | 4/1977 | Taylor | G01F 1/38 73/861.47 |
| 4,192,193 | A * | 3/1980 | Schnell | G01L 7/04 73/739 |
| 4,333,348 | A * | 6/1982 | Berninger | G01D 11/26 73/708 |
| 7,334,909 | B2 * | 2/2008 | Williamson | B63C 11/02 362/101 |
| 2007/0140314 | A1 * | 6/2007 | Rhodes | G01K 1/08 374/158 |
| 2009/0044631 | A1 * | 2/2009 | Neighoff, Jr. | G01L 19/16 73/738 |

FOREIGN PATENT DOCUMENTS

WO  WO-2015066229 A2 *  5/2015  ............. G01N 27/10

* cited by examiner

*Primary Examiner* — Lisa M Caputo
*Assistant Examiner* — Nasir U. Ahmed
(74) *Attorney, Agent, or Firm* — Muncy, Geissler, Olds & Lowe, P.C.

(57) ABSTRACT

A gauge including a housing, a measuring port, an opening formed in the housing and a cover for covering the opening. The cover of the gauge is selected from a range of flexible and translucent materials.

22 Claims, 7 Drawing Sheets

GAUGE WITH A FLEXIBLE WINDOW COVER

This nonprovisional application claims priority to U.S. Provisional Application No. 62/694,014, which was filed on Jul. 4, 2018, and which is herein incorporated by reference.

BACKGROUND OF THE INVENTION

Field of the Invention

The present invention relates to a gauge with a flexible window cover and a flexible cover for a gauge.

Description of the Background Art

Conventional gauges, such as manometers, have hard crystal or plastic covers or glasses that are subject to cracking and breakage, in particular when used in high temperature and/or high pressure environments. See, for example, DE 1807714 U. Furthermore, some of the conventional gauges need to have additional components in order to activate e. g. a reading mechanism of the gauge. Therefore, there are multiple points of failure in such gauges, in particular concerning their housings and covers or windows.

SUMMARY OF THE INVENTION

It is therefore an object of the invention to provide an improved gauge, which overcomes the above mentioned problems.

The present disclosure provides design, material, and use alternatives for gauges which are particularly suitable for use under adverse conditions. Furthermore, the disclosure provides corresponding information with regard to covers for such gauges.

In an exemplary embodiment, a gauge, for example a manometer, is provided. The gauge comprises a viewing window or cover which has a higher degree of flexibility compared to the state of the art. The cover may contain or be entirely made of e.g. a silicone material. The terms cover and window may relate to the same component in the present case.

In an exemplary embodiment the gauge may be a fluid filled gauge such as a fluid filled manometer, wherein the fluid is provided for vibration damping in applications, in which heightened or considerable vibrations occur.

In an exemplary embodiment, additionally to the fluid there may also be a gas bubble within the housing. Here, the damping fluid contained in the gauge may change its density and/or pressure due to e. g. temperature changes and corresponding pressure changes of the gas bubble. In the case of a temperature increase, the damping fluid and/or the gas bubble may expand, whereupon the expansion of the content of the gauge is compensated by the deformation and/or displacement of the flexible cover.

The cover may be formed as a partly or entirely flat component or it may be formed as a lens with at least one curved surface. In the case of a lens, the cover may provide a magnifying function. Thus, the values measured and displayed by the gauge may be easier to read and/or the gauge may have smaller overall dimensions.

The cover, which may function as a viewing window, may be flexibly connected to the housing via, for example, a crimp or a seam. Since the cover is flexible, the functioning of the gauge, in particular the pressure gauge, may be tested by pushing the cover towards the inside of the housing: if pressure is applied manually on the cover, said pressure is exerted also on the inside of the housing, which causes a needle or hand or some other display of the gauge to indicate a changing pressure. Although reference may be made to pressure gauges, the present invention is not limited to such devices and may refer to other gauges such as temperature gauges or thermometers.

Further, the invention may comprise a flexible cover that is made of silicone and in particular of optical clear liquid silicone rubber for use in, for example, pressure gauges, thermometers, etc. It can be intended for temperature compensation of 100% liquid filled gauges, for subsea gauges and any instrument requiring high ambient temperatures, such as instruments or gauges used with autoclaves. An advantage of the present invention is that the cover will not break or shatter, even under adverse conditions. Further, using of the flexible cover will improve an ingress protection and leads to the advantage, that there is no need of venting ports, thus the improving of the ingress protection is higher. Further, the flexibility of the cover leads to the advantage, that the gauge is less prone to leaks due to pressure buildup in the gauge.

The cover of the gauge may be formed integrally with a gasket, which has the advantage of there being less parts and/or steps (gaskets, compensation membrane, gluing process, etc.) necessary to produce a gauge. As a result, the assembly of the gauge is simplified considerably.

The present invention is particularly relevant for pressure gauges which may be constantly filled with liquid filling for damping purposes. Such gauges are used for applications with increased vibration levels. Under such circumstances, expansion of the filled damping fluid under temperature may occur, which in return can then be compensated for by the flexible cover in the form of e.g. a viewing lens.

In addition, by pressing the flexible cover, the functioning of the gauge can be simply checked. In this case, the pressure inside the housing can be increased by applying a pressure manually on the cover. Thus, the mechanism of the gauge may be excited, and the pointer or indicator of the gauge may be moved for checking.

The cover may be designed as a flexible and optically clear window for viewing the measurement values displayed by the gauge. In an exemplary embodiment the flexible cover can be used as a pressure compensation element, in particular with 100% liquid filled gauges. This is particularly useful in the case of subsea applications, as, according to the invention, corresponding subsea gauges do not need any additional parts like compensation membranes or an additional gluing process during assembly of the gauge. Further, a high filling degree leads to the advantages, that fogging of the cover and condensation on the inside of the cover can be prevented. Thus, the gauge has a much better readability and no air bubble is needed for proper functioning of the liquid fill gauge. Further, the high filling degree of the gauge leads to the advantage, that a size of an air bubble or sizes of air bubbles can be minimized, so that defacing effects on the visibility of a scale of the gauge, for example a different refractive index of light between the cover and the air bubble and between the cover and liquid, are minimized.

The flexible cover can be used in various ranges such as the 15 psi range including vacuum but also above. Advantageously, there is no visible effect of liquid fill temperature induced error, which is most influential up to 300 psi.

The cover can be designed to have the same optical clarity as e. g. glass. Thus, much higher temperature optical and mechanical stability up to ca. 150° C./300° F. compared to gauges and covers known from the art can be provided.

The flexibility of the cover can be maintained in temperatures ranging from −55° C. to +300° C., and corresponding operation of the gauges is hence possible.

If liquid filled, the cover can be designed to provide maximum flexibility and optical stability in a temperature range from −40° F./−40° C. to 160° F./71° C.

The present invention opens up some great potential for autoclave sanitary gauge applications, whereby expensive polysulfone (PSU) windows may be replaced. Thus, better clarity of the gauge screens can be provided compared to the amber tint present with known PSU screens.

Since a flexible material can be used for the cover, it is possible to provide a novel component, which combines a cover and a seal, both formed integrally with each other. This allows in return to reduce assembly and inventory costs. The flexible cover window therefore has a great advantage in that it replaces a compensation membrane and a seal and makes a nonstandard and therefore expensive housing (like a housing having a weep hole) superfluous. A complicated gluing process of the membrane to the case is not needed anymore. Furthermore, providing different finishes of the cover can help fight glare.

The cover exhibits all safety features and can be considered a "safety window". The cover can be made of liquid silicone rubber (LSR), which is far more flexible than glass, reducing the chance of breakage. While the cover is flexible enough not to break, it is particularly valuable in applications in which the gauge is exposed to a variety of vibrations, shocks and blows.

The material of the cover can be resistant to scratching and cracking.

The cover can be made of a material, which is resistant to UV radiation and yellowing. Thus, the cover is ideal for outdoor applications. This is particularly true in comparison to PC or acrylic covers, which are exposed to UV radiation and aged at 200° C.

The material of the cover may be significantly lighter than glass.

The cover may take the shape of a lens, magnifying features can be implemented in the cover for easier reading of the gauge display. This is linked to the fact that the stiffness of optical LSR is similar to, for example, vehicle light lenses.

The cover can be made of chemically inert materials and compatible for use in $O_2$ applications.

The material may be resistant to bacteria, ozone and harmful radiation.

The ease of use of corresponding gauges is further improved as the material cover may be hydrophobic. Hence, water and rain droplets from the surface of the cover are repelled, which improves the visibility of the indicator of the gauge. Furthermore, the venting of the gauge and corresponding venting mechanisms become obsolete.

The invention is also directed to a flexible and translucent cover for covering an opening of a gauge. The cover comprises an external gasket portion and an internal window portion or viewing portion, wherein said gasket portion and said window portion are formed integrally and made of the same material. The gasket portion and the window portion may be connected to each other by a flexible intermediate portion as described above. The intermediate portion may comprise a geometry which renders the intermediate portion the most flexible part of the cover.

The intermediate portion may be designed as a spring portion which has higher flexibility than both, the gasket and the window portion. The characteristics of the cover taken alone may be identical to the characteristics of the cover as described above as part of a gauge. For instance, the material of the cover may be an optical liquid silicone rubber or any other material, which can be shaped to provide both, flexibility for pressure compensation and clarity for the reading of the gauge.

The cover can further comprise a reinforced rim portion, which may include the function of a gasket. Thus, a separate gasket is not needed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The following detailed description shows various configurations of the subject technology. It does not represent the only possible configurations of the subject technology. The drawings are a part of the detailed description. The detailed description includes specific details for the purpose of providing a thorough understanding of the subject technology. However, it will be clear to a person of skill in the art that the subject technology is not limited to the specific details set forth herein and may be practiced without these specific details.

Figure 1:
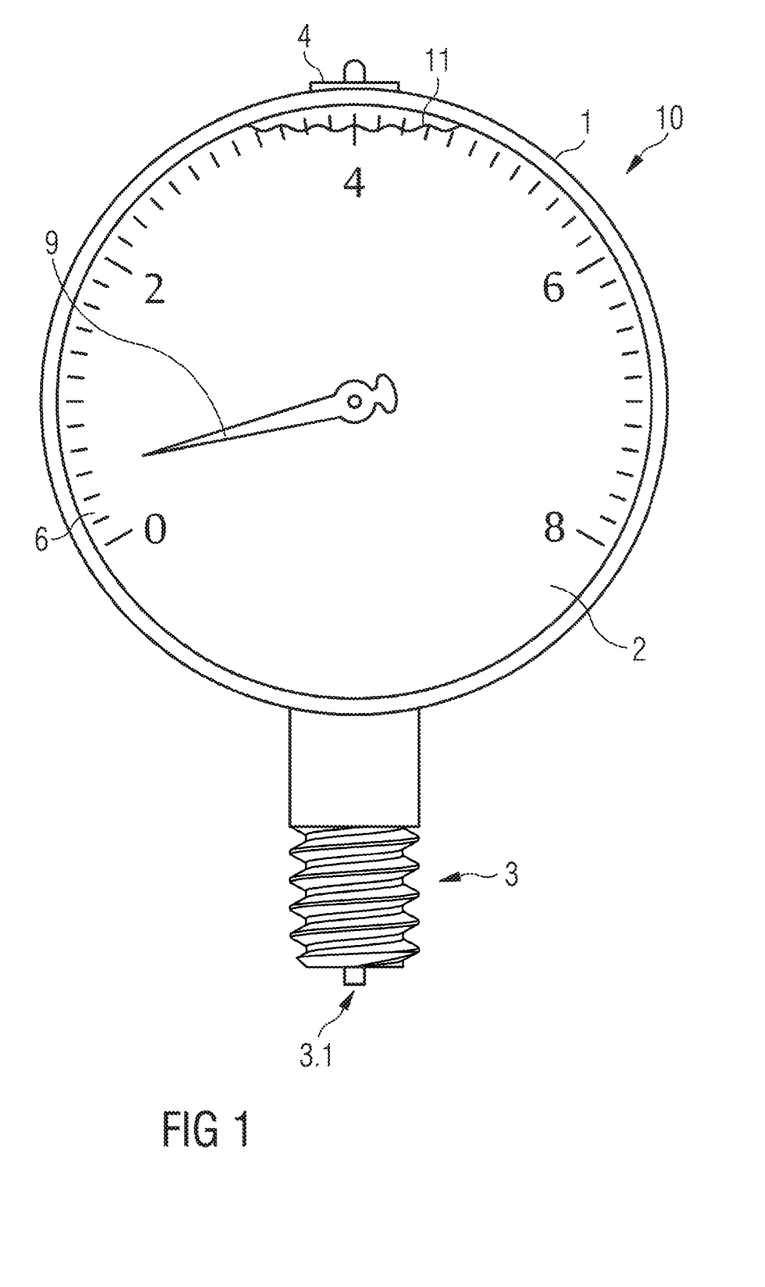
FIG. 1 is a schematic front view of a gauge of an embodiment.

FIG. 1 is a front view of an exemplary embodiment of a gauge 10 of the subject technology. The gauge 10 comprises a housing 1, a cover 2, a measuring port 3 including a canal 3.1 and an opening covered by said cover 2. Although the gauge of FIG. 1 features an analog display comprising a dial or scale 6 and a hand or indicator 9, the gauge 10 of the present invention is also applicable for other displays such as digital displays.

The dial could also be a LCD, OLED or other display displaying a pointer and a dial presenting different "printings" or units, such as PSI or BAR, which may selected and switched on or off by a user and a not shown button or menu or via wireless access if the gauge is powered by battery or a different source of electrical energy.

The gauge 10 may be a liquid filled gauge 10, as shown by the liquid level 11 in FIG. 1. It is to be noted, that the invention allows for the construction of liquid filled gauges 10 which are completely filled by a liquid and do not require a gas remnant above liquid level 11 for pressure compensation or other purposes. This is due to the fact that the cover 2.2 and the frame 8 shown in FIG. 2 compensate volume changes of the fluid inside the gauge 10 by displacement and/or deformation of the cover 2.

The cover 2 is made of a translucent material as is usually the case. However, the material of the cover 2 is at the same time a flexible material and may be an elastomer material. This combination is a novel feature. The flexibility or elasticity of the material is chosen so as to allow for pressure compensation of the gauge 10 by displacement and/or deformation of the cover 2. The pressure compensation may become necessary after an external or internal pressure change or temperature change. All features pertaining to the cover 2 and described in the context of the gauge 10 also apply to the aspect of the invention directed to the cover alone.

Figure 2:
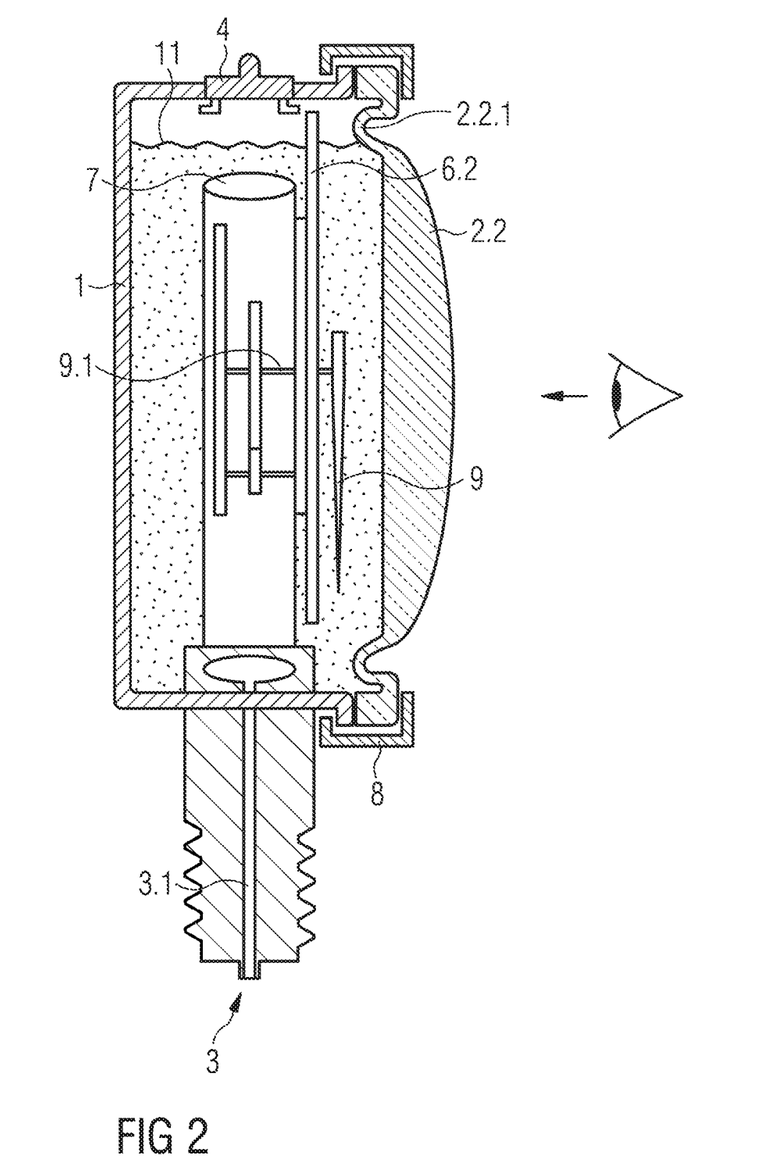
FIG. 2 is a schematic sectional view of a gauge of an embodiment.

FIG. 2 is a sectional view of an exemplary embodiment of a gauge 10 of the subject technology. If not specified otherwise reference numbers such as 6.2 and 2.2 in FIG. 2 correspond to features such as scale 6 and cover 2 of FIG. 1. The same applies to FIGS. 3A, 3B and 4. The gauge 10 may be a pressure gauge. A movement is shown inside the housing of the gauge 10, which together with the indicator axis 9.1 connects the indicator 9 to a bourdon tube 7 or any other pressure sensitive component. Although a bourdon tube 7 is shown, the invention may apply to any gauge 10 comprising a translucent cover element. Hence, digital gauges also fall under the scope of the invention. In general, the gauge 10 may be a pressure gauge, a temperature gauge or any other gauge. The gauge may be liquid filled to more than 90% or to over 95% or to over 99% or to 100%.

The cover 2.2 may have a varying thickness over its radius and may therefore be formed as a lens, in particular as a magnifying lens. A magnifying lens allows for a better visibility of the displayed values which in return means that a smaller gauge 10 may be used.

Further, the cover 2.2 may be formed integrally with an external gasket portion, the gasket portion corresponding to the hollow cylindrical portion or the rim 5 portion of the cover 2.2. The external gasket portion may be the outermost portion of the cover 2.2. The gasket and the remaining portions of the cover 2.2 may be made of the same material. In particular, all the components of the cover 2.2 may be formed integrally.

The central portion of the cover 2.2 may be described as an internal window portion or viewing portion, as the dial of the gauge 10 is visible through this central, innermost portion of the cover 2.2. The window portion may be connected to the gasket portion by a flexible intermediate portion 2.2.1. Said flexible intermediate portion may comprise the thinnest portion of the whole cover 2.2 structure. Alternatively or additionally, the intermediate 2.2.1 portion may comprise other geometric features to provide added flexibility to the cover 2.2. In one embodiment, the intermediate portion 2.2.1 comprises one or more e. g. circular grooves or recesses which surround the window portion of the cover 2.2. Alternatively or additionally, the intermediate portion 2.2.1 may comprise one or more protrusions which bulge in the opposite direction of the convex side of the lens. Furthermore, the thickness of the cover 2.2 may vary such that the greatest thickness is at the center of the cover 2.2 and the smallest thickness is at the intermediate portion 2.2.1 and has an intermediate value at the gasket portion.

By using a flexible material such as silicone the cover 2.2 may be easily formed to fulfill multiple functions: the outer gasket portion seals the gauge 10 from the outside, the intermediate portion 2.2.1 facilitates the deformation of the cover 2.2 for pressure compensation and the lens shaped window portion magnifies the gauge 10 dial for better visibility. All functions are facilitated or enabled by the choice of a sufficiently flexible and translucent material.

The cover 2.2 may be attached to the housing 1 by any attaching mechanism, such as a frame 8. Because of the material selected for the cover 2.2, no gluing and no additional sealing may be required for providing a fluid tight connection between the cover 2.2 and the housing 1. An additional opening 4 for filling of liquid or for other purposes may be provided at some place of the housing structure. The housing 1 shown in FIG. 2 may therefore have at least or exactly three openings: the main opening for reading the gauge 10, covered by the cover 2.2, the opening corresponding to measuring port 3 and an additional opening 4 for other purposes, usually covered by some other cover.

The material of the cover 2.2 may be some silicone material. However, optical liquid silicone rubber is used in an exemplary embodiment.

Figure 3A:
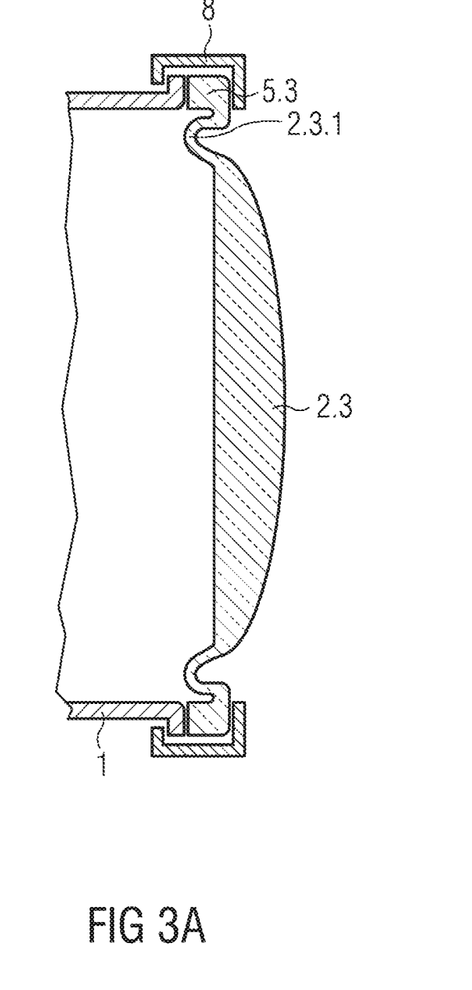
FIG. 3A is a schematic augmented sectional view of a gauge of an embodiment.
Figure 3B:
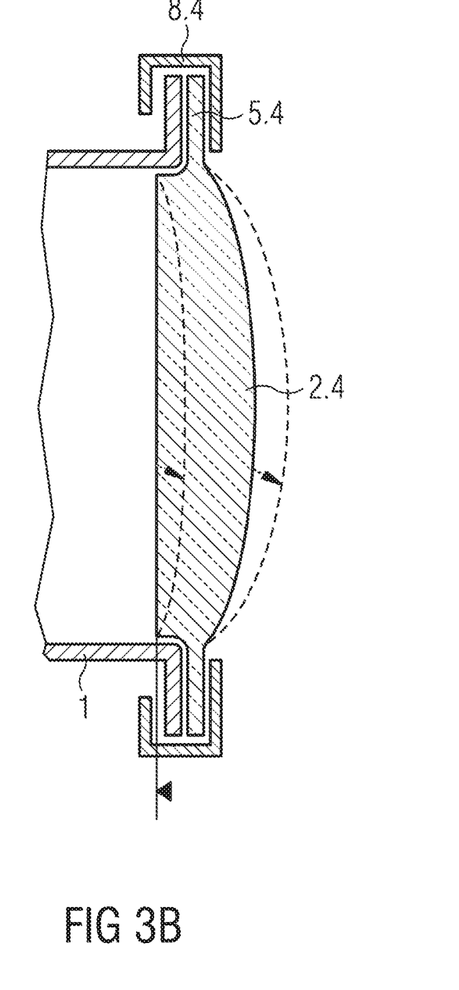
FIG. 3B is a schematic augmented sectional view of a gauge of the an embodiment when subjected to a pressure change.

FIGS. 3A and 3B are augmented sectional views of an exemplary embodiment of a gauge 10 of the subject technology. The gauge 10 is shown to be subjected to a pressure change and/or a temperature change. As indicated by the arrows in FIG. 3B, the cover 2.4 is sufficiently flexible to allow for a compensating deformation and/or displacement, when subject to a pressure gradient or pressure change between the inside and the outside of the gauge 10. This compensating deformation corresponds to the pressure compensation achieved by the flexible cover 2.4 of the invention.

One major advantage of the two embodiments of FIGS. 3A and 3B concerns the housing 1 of the gauge 10. FIGS. 3A and 3B show no additional opening 4 as seen in e.g. FIG. 2. This opening 4 may be or comprise a ventilation opening, a pressure relive membrane, a tap and/or a separate opening for filling or emptying the housing 1 of the gauge 10. As the flexible cover 2 ensures that no ventilation is necessary for pressure compensating purposes, said opening 4 may be omitted altogether. Thereby, the construction of the gauge 10 is simplified and made cheaper.

If the additional opening 4 for filling liquid into the gauge 10 is omitted, as in FIGS. 3A and 3B, the gauge 10 can be filled through the main opening, prior to the attachment of the cover 2.3, 2.4.

The housing 1 may be a pot-like metal or plastic structure which comprises exactly two openings, wherein one opening has a circular or other shape and is oriented in the axial direction of the pot-like structure and the other opening has a circular or other shape and is oriented in a radial direction of the pot-like structure. The radially oriented opening may be smaller than the axially oriented opening and may connect the measuring port 3 to the inside of the gauge.

To ensure that the cover 2.3, 2.4 is sufficiently flexible, its "Shore A"-hardness may be selected to be in the range of 72±10 or in the range of 72±5 or in the range of 72±1. More generally and depending on the purpose and environment of the gauge, the flexibility of the cover 2.3, 2.4 is selected to be in a range which allows pressure compensation of the gauge 10 by displacement and/or deformation of the cover

Figure 5:
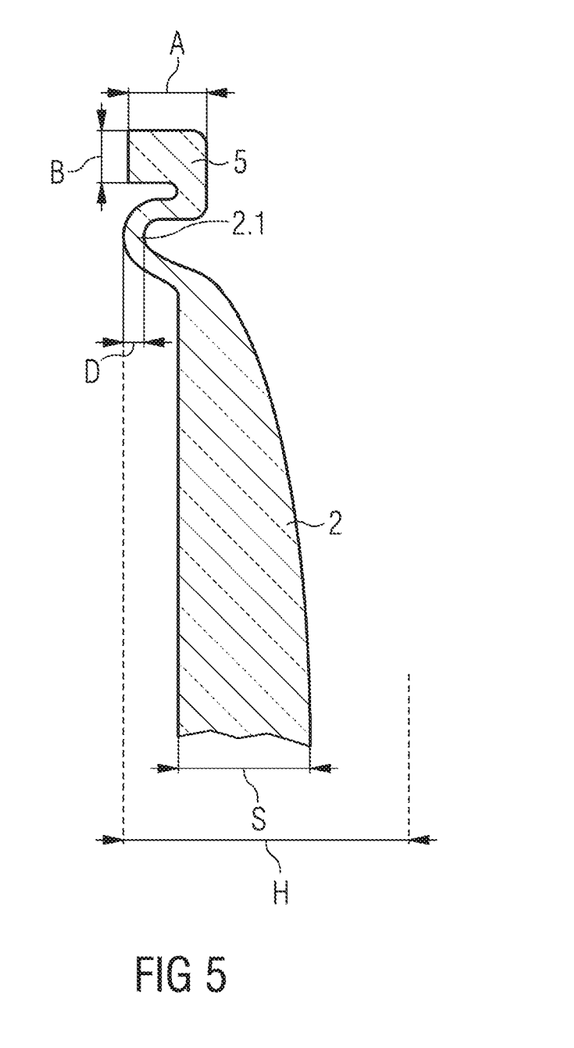
FIG. 5 is a schematic detailed sectional view of a cover of an embodiment.

2.3, 2.4. As shown in FIG. 5, the cover 2 allows for a movement H of the cover of up to −10 mm to 10 mm or up to −2.5 mm to 2.5 mm or up to −1 mm to 1 mm for pressure compensation.

Whereas FIG. 3B shows cover 2.4 with a flat rim portion 5.4, FIGS. 3A and 5 show a thicker reinforced rim portion 5.3 and 5. The rim portion 5, 5.3, 5.4 is shown to be attached to the housing 1 by means of the frame 8.

Figure 4:
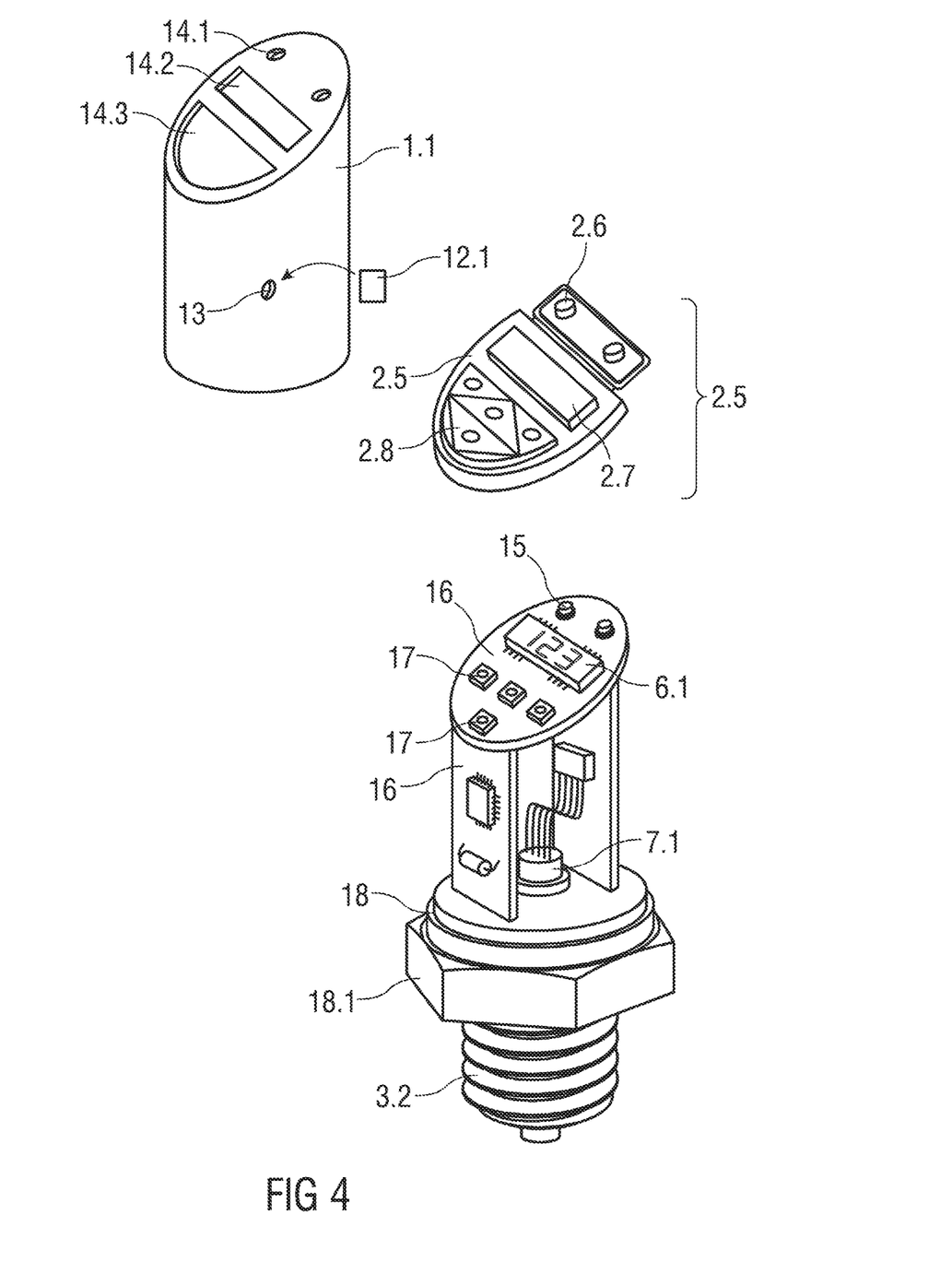
FIG. 4 is a schematic detailed embodiment of an electronical gauge, sensor unit.

FIG. 4 shows an exemplary embodiment of an electronical gauge 10 with a sensor unit having a sensor base 18 with a measuring port 3.2 and a sensor 7.1 for measuring pressure. A structure of PCBs, printed circuit boards, supports a display 6.1, LED indicators 15 and switches 17. The flexible window cover 2.5 has a window part 2.7 for covering the display 6.1 and integral formed rubber knobs 2.6 and 2.8 to cover the switches 2.8 and LED indicators 15, so that a membrane 12.1 (pressure adjusting membrane) which is assembled and sealed to a venting hole 13 is not needed in future, because a pressure difference from the outside of the housing 1.1 to the inside of the housing 1 is made by the flexible rubberlike display cover. The housing 1.1 is assembled, sealed and/or welded to the sensor base 18, and has opening 14.1, 14.2 and 14.3 to the knobs 2.6 and 2.8 and the flexible window 2.7. The housing 1.1 presses the integral window cover part 2.5 to the support PCB structure for a good sealing function to the housing 1.1.

Further, the shown embodiment leads to the benefit, that there is no need of a venting port. That will improve an ingress protection.

FIG. 5 is a detailed view of an exemplary embodiment of a more complex cover geometry: The rim portion 5 may be reinforced and may comprise a hollow cylindrical portion extending over a distance A in the axial direction of the cover 2. Distance A may be in the range of 0 mm to 15 mm or 0 mm to 10 mm or 0 mm to 5 mm. The axial direction corresponds to the left-right direction of the drawing plane of FIG. 5.

The hollow cylindrical portion may have a thickness B which may be ca. two or three times smaller than the distance A. The thickness B may be equal to or greater than the thickness D of the cover 2 at its thinnest portion. The thickness D of the cover 2 at its thinnest portion is in a range of 0 mm to 5 mm or in a range of 1 mm to 5 mm or in a range of 1 mm to 3 mm. The thickness D may be defined as the extension of the cover 2 in the axial direction or viewing direction of the gauge 10.

The hollow cylindrical portion may be connected to the remaining cover structure by means of a bridge, said bridge being situated at the outer end of the hollow cylinder portion. The outer end of the hollow cylinder portion may be the section of the cylinder pointing away from the housing 1 of the gauge 10 as shown in FIG. 3. Alternatively, said bridge may be situated at an inner end of the hollow cylinder portion or at a central position thereof. The hollow cylindrical portion may be the radially most outward portion of the cover 2.

As is clearly visible in FIG. 5, the cover 2 may be formed integrally with an external gasket portion, the gasket portion corresponding to the hollow cylindrical portion or the rim 5 portion of the cover 2. The external gasket portion may be the outermost portion of the cover 2. The gasket and the remaining portions of the cover 2 may be made of the same material. In particular, all the components of the cover 2 may be formed integrally.

The central portion of the cover 2 may be described as an internal window portion or viewing portion, as the dial of the gauge 10 is visible through this central, innermost portion of the cover 2. In the embodiment of FIG. 5 the window portion is the portion of the cover 2 which has the greatest thickness S at its center. In this case, the cover 2 functions as a magnifying lens. The window portion may be connected to the gasket portion by a flexible intermediate portion. Said flexible intermediate portion may comprise the thinnest portion of the whole cover 2 structure. Alternatively or additionally, the intermediate portion may comprise other geometric features to provide added flexibility to the cover 2. In one embodiment, the intermediate portion comprises one or more e.g. circular grooves or recesses which surround the window portion of the cover 2. Alternatively or additionally, the intermediate portion may comprise one or more protrusions which bulge in the opposite direction of the convex side of the lens. Furthermore, the thickness of the cover 2 may vary such that the greatest thickness is at the center of the cover 2 and the smallest thickness is at the intermediate portion and has an intermediate value at the gasket portion.

By using a flexible material such as silicone the cover 2 may be easily formed to fulfill multiple functions: the outer gasket portion seals the gauge 10 from the outside, the intermediate portion facilitates the deformation of the cover 2 for pressure compensation and the lens shaped window portion magnifies the gauge 10 dial for better visibility. All functions are facilitated or enabled by the choice of a sufficiently flexible and translucent material.

Figure 6:
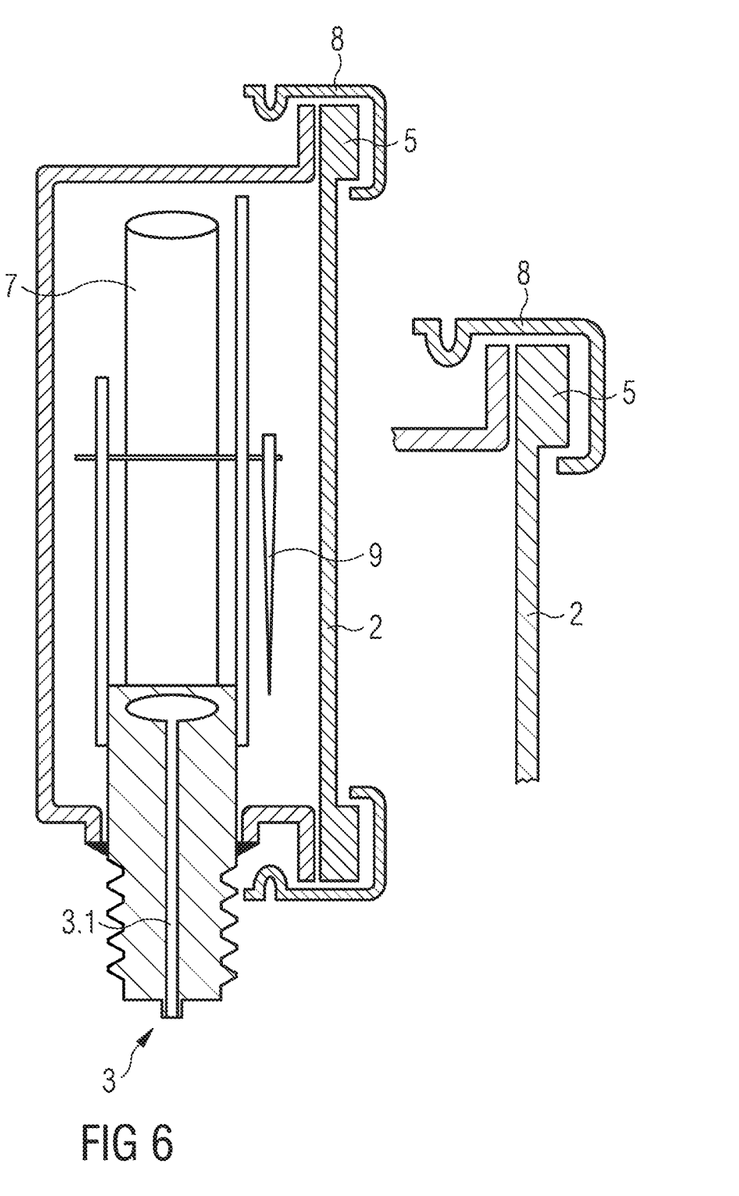
FIG. 6 is a schematic sectional view of an embodiment of the gauge.

FIG. 6 is a sectional view of another exemplary embodiment of the subject technology. The cover 2 has a flat cross sectional profile and therefore does not provide a magnifying effect in the first place. In the embodiment of FIG. 6, the thickest portion of the cover 2 is the gasket portion. If the cover 2 of FIG. 2 is subjected to internal pressure, such that it bends towards the outside, a magnifying effect can be achieved even with the flat cover geometry of FIG. 6.

Figure 7:
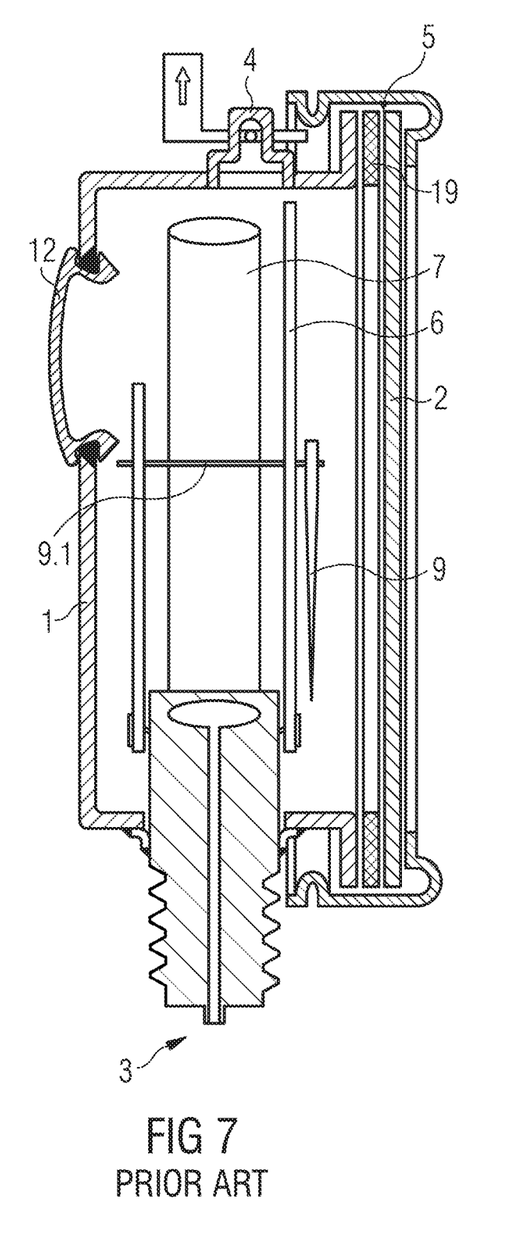
FIGS. 7 and 8 show schematic different prior art gauges in various details.
Figure 8:
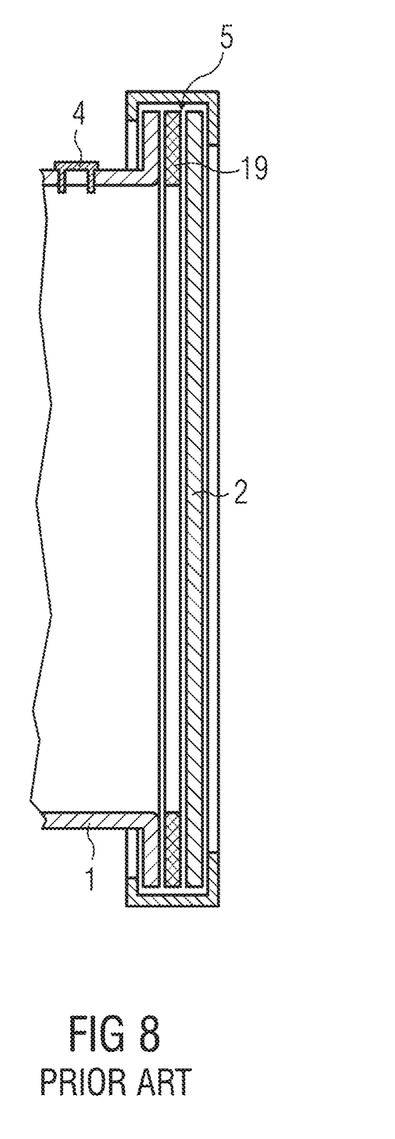

FIGS. 7 and 8 show prior art gauges in various details. FIG. 7 shows a gauge with a complicated housing comprising at least two additional openings for pressure compensation and/or for the filling of liquid into the gauge. Both FIGS. 7 and 8 show additional gaskets 19 for sealing the interior of the gauge.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A gauge comprising:
    a housing that contains a fluid and a gauge indicator therein;
    a measuring port;
    an opening formed in the housing; and
    a window cover for covering and closing the opening of the housing, such that an inner surface of the window cover directly contacts the fluid inside the housing, wherein the window cover comprises a flexible translucent material to facilitate external viewing of the gauge indicator and to facilitate pressure compensation of the fluid in the housing.

2. The gauge according to claim 1, wherein the window cover is flat or formed as a lens.

3. The gauge according to claim 1, wherein the gauge is a pressure gauge or a temperature gauge.

4. The gauge according to claim 1, wherein the material of the window cover is silicone.

5. The gauge according to claim 1, wherein the window cover is made of liquid silicone rubber or optical liquid silicone rubber (LSR).

6. The gauge according to claim 1, wherein a Shore A hardness of the window cover is in the range of 72±10 or in the range of 72±5 or in the range of 72±1.

7. The gauge according to claim 1, wherein the flexibility of the window cover is selected to be in a range which allows the pressure compensation of the fluid in the gauge by displacement of the window cover.

8. The gauge according to claim 1, wherein the fluid is a liquid such that the gauge is a liquid filled gauge or a subsea gauge or any instrument requiring high ambient temperatures or a bimetal thermometer.

9. The gauge according to claim 1, wherein the flexibility of the window cover is selected to allow for a movement of the window cover of up to −10 mm to 10 mm or up to −2.5 mm to 2.5 mm or −1 mm to 1 mm for the pressure compensation.

10. The gauge according to claim 1, wherein a thickness of the window cover at a thinnest portion is in a range of up to 10 mm or in a range of 2 mm to 5 mm or in a range of 1 mm to 3 mm.

11. The gauge according to claim 1, wherein the window cover is formed integrally with a gasket and wherein the window cover and the gasket are made of the same material.

12. The gauge according to claim 1, wherein there is no ventilation opening in the housing and/or wherein there is no tap and/or separate opening for filling or emptying the housing and/or wherein the window cover is not glued to the housing.

13. The gauge according to claim 1, wherein the housing is made of a pot-shaped metal or plastic structure which comprises exactly two openings, wherein a first one of the two openings is the opening covered by the window cover and has a circular or other shape and is oriented in the axial direction of the pot-shaped structure and a second one of the two openings has a circular or other shape and is oriented in a radial direction of the pot-shaped structure for the measuring port.

14. The gauge according to claim 1, wherein the window cover comprises a gasket portion and a window portion, wherein the gasket portion and the window portion are connected by a flexible intermediate portion.

15. The gauge according to claim 1, wherein the fluid is a liquid and wherein the gauge is filled with the liquid to a percentage of 70% to 95% or to over 95% or to over 99% or to 100%.

16. The gauge according to claim 1, wherein the housing has exactly two openings, wherein a first one of the two openings is the opening covered by the window cover and a second one of the two openings is provided for the measuring port.

17. A flexible and translucent window cover for covering and closing an opening of a gauge and to facilitate pressure compensation of a fluid in the gauge, wherein the window cover comprises an external gasket portion and an internal window portion, and wherein the gasket portion and the internal window portion are formed integrally and made of the same material, and wherein a first surface of the window cover that faces an interior of the gauge directly contacts the fluid in the gauge.

18. The window cover according to claim 17, further comprising a flexible intermediate portion connecting the gasket portion to the internal window portion.

19. The window cover according to claim 18, wherein the flexible intermediate portion is designed as a spring portion which has higher flexibility than both the gasket portion and the internal window portion.

20. The window cover according to claim 17, wherein the gasket portion is a reinforced rim portion.

21. The cover according to claim 17, wherein the window cover is made of optical liquid silicone rubber (LSR).

22. A gauge comprising: a housing, a measuring port, an opening for viewing a gauge display and a window cover for covering and closing the opening, wherein the opening is formed in the housing, wherein the window cover is made of silicone so as to be flexible to facilitate pressure compensation of a fluid in the housing, and wherein an inner surface of the window cover directly contacts the fluid in the housing.

* * * * *